Figure 1:
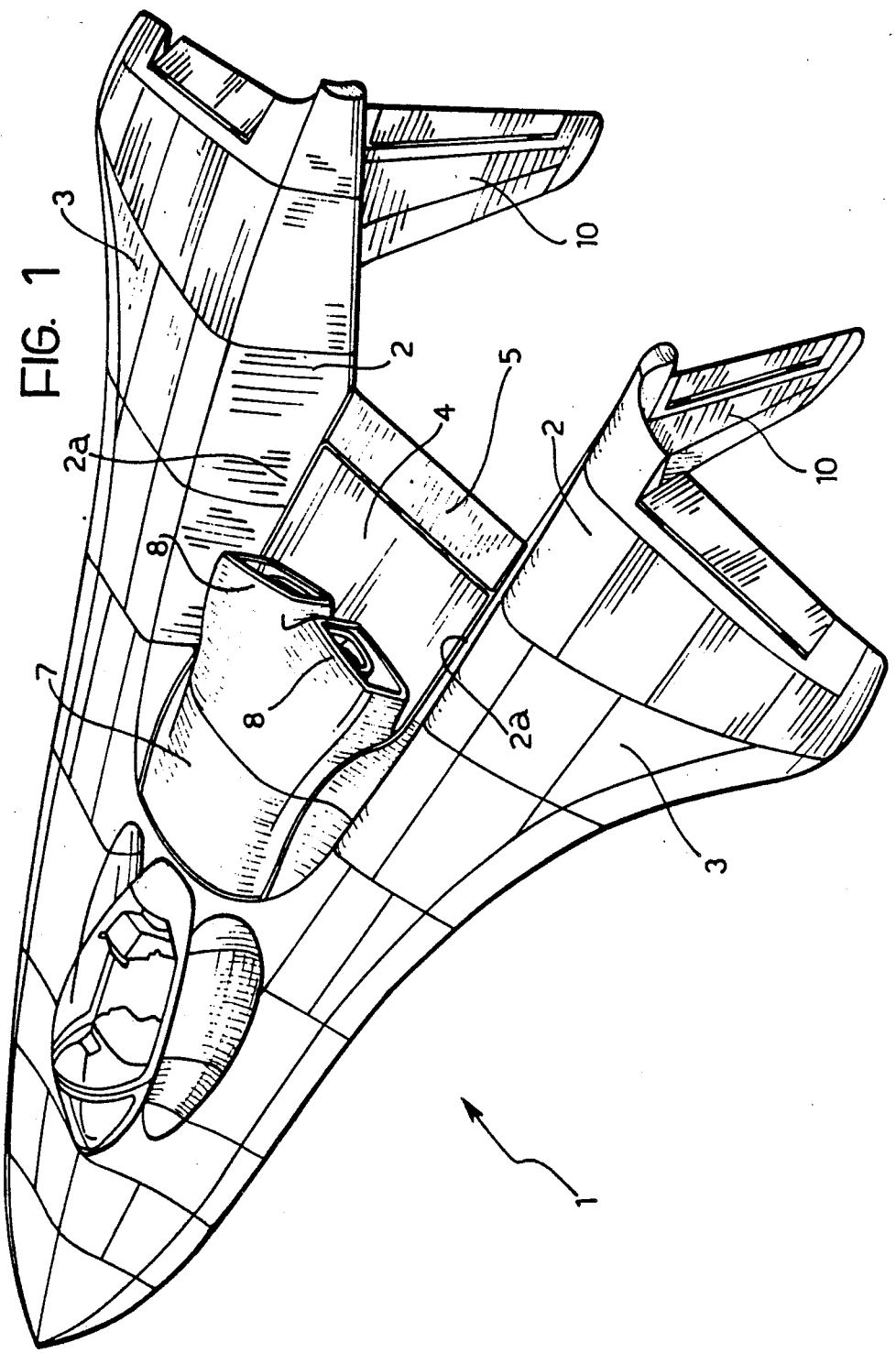

United States Patent [19]

Capuani

[11] Patent Number: 4,969,614
[45] Date of Patent: Nov. 13, 1990

[54] JET-PROPELLED AIRCRAFT

[75] Inventor: Alfredo Capuani, Turin, Italy

[73] Assignee: Aeritalia - Societe Aerospaziale Italiana - p.A., Turin, Italy

[21] Appl. No.: 501,401

[22] Filed: Mar. 19, 1990

Related U.S. Application Data

[63] Continuation of Ser. No. 242,408, Sep. 9, 1988, abandoned.

[51] Int. Cl.$^5$ .............................. B64C 15/12
[52] U.S. Cl. ................... 244/12.4; 244/23 D; 244/12.3; 244/12.5; 244/55; 244/56
[58] Field of Search ............. 244/12.3, 12.4, 12.5, 244/23 D, 55, 56, 87

[56] References Cited

U.S. PATENT DOCUMENTS

| | | | |
|---|---|---|---|
| 1,893,129 | 1/1933 | Charpentier | 244/87 |
| 3,307,807 | 3/1967 | Stoppe | 244/56 |
| 3,576,300 | 4/1971 | Palfreyman | 244/55 |
| 4,478,378 | 10/1984 | Capuani | 244/12.5 |
| 4,538,779 | 9/1985 | Goldstein | 244/87 |

FOREIGN PATENT DOCUMENTS 1032113  6/1966  United Kingdom ............ 244/12.5

OTHER PUBLICATIONS

Jane's All The World's Aircraft 1982-1983, Jane's Publishing Company Limited, pp. 484–486.

Primary Examiner—Sherman Basinger
Assistant Examiner—Anne E. Bidwell
Attorney, Agent, or Firm—Sughrue, Mion, Zinn, Macpeak & Seas

[57] ABSTRACT

In a jet-propelled aircraft of the type in which the propulsion jets are directed onto a wing so as to achieve an ejector effect, two vertical tail-fin surfaces are provided and extend downwardly beneath the center of gravity of the aircraft to return the aircraft to a correct attitude when it tends to move sideways relative to the direction of flight.

4 Claims, 3 Drawing Sheets

JET-PROPELLED AIRCRAFT

This a continuation of Ser. No. 242,408, filed Sept. 9, 1988, now abandoned.

The present invention relates to a jet propelled aircraft of the known type having a wind and jet propulsion means adapted to direct propulsion jets over the dorsal surface of the wing adjacent its trailing edge, so as to achieve additional lift due to the supercirculation induced on the wing and the downward deflection of the jet which occurs as a result of the Coanda effect immediately downstream of the wing, and so as to define a single-surface ejector system in which the primary fluid is constituted by the jets, the secondary fluid is constituted by the relative air flow over the wing, and the successive zones of expansion, mixing and recompression of the ejector are defined by a single active surface constituted by the back of the wing.

An aircraft of the type described above constitutes the subject of the U.S. Pat. No. 4,478,378 and of the corresponding European patent application EP-A-0078245 in the name of the same Applicant. By virtue of the characteristics described above, the aircraft is able to take off and land in extremely short distances and is extremely manoeuvrable.

The object of the present invention is further to improve the performance of the aircraft proposed previously, particularly from the point of view of stability in flight.

In order to achieve this object, the invention provides an aircraft of the type, indicated at the beginning of the present description, characterised in that it has the general configuration of a delta-shaped all-wing aircraft with two fuselage sections between which is a central wing constituting the wing over which the propulsion jets are directed, the two rear ends of the fuselage sections having two vertical fin surfaces which project downwardly and extend beneath the centre of gravity of the aircraft, these fin surfaces being spaced from each other by a distance substantially corresponding to the width of the mixed stream of the propulsion jets and of the secondary flow downstreams of the wing, so that these fin surfaces are laterally adjacent the mixed stream so as to achieve a self-stabilizing effect which immediately corrects any tendency of the aircraft to assume a position in which its longitudinal axis is transversal to the direction of flight.

By virtue of the configuration described above, the aircraft according to the invention is extremely stable in flight. In particular, when the aircraft tends to assume a position in which its longitudinal axis is transversal with respect to the direction of flight, the relative air flow acquires a transverse component which is maintained in the secondary flow (sucked back by the ejector effect from the propulsion jets) and in the mixed stream downstream of the wing. The effect of this transverse component on the vertical fin surface towards which it is directed imparts to the aircraft a yawing moment and a rolling moment which tend to return the latter to its correct attitude in alignment with the direction of flight. In other words, the mixed stream downstream of the central wing of the aircraft constitutes a sort of rail engaged laterally by the two vertical fin surfaces so that any tendency of the aircraft to assume a position transversal to the direction of flight is automatically corrected. Since the two vertical fin surfaces are immediately adjacent the stream downstream of the wing, the correction of any tendency of the aircraft to assume a transversal position sideways is immediate.

Figure 2:
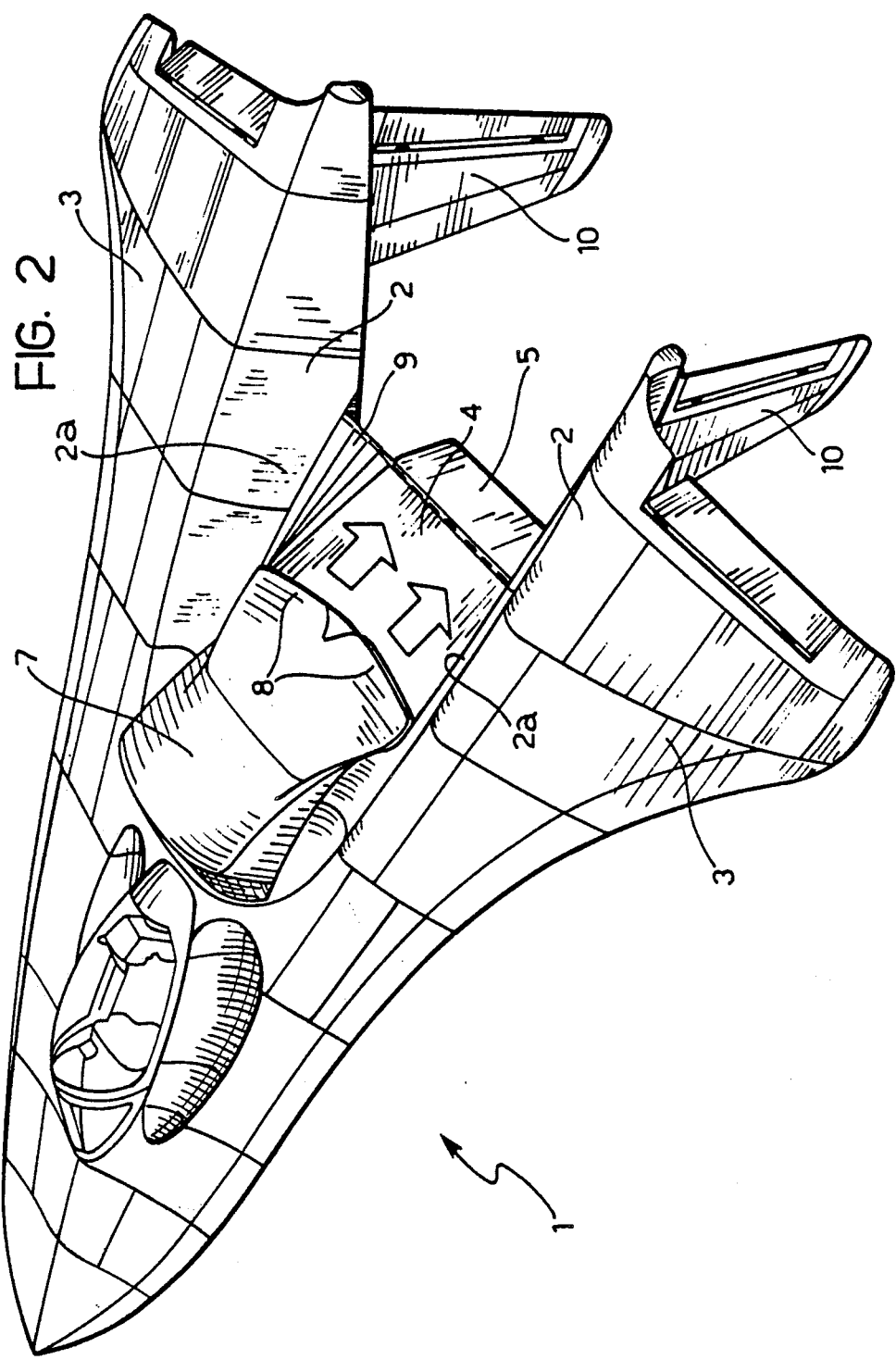
Figure 3:
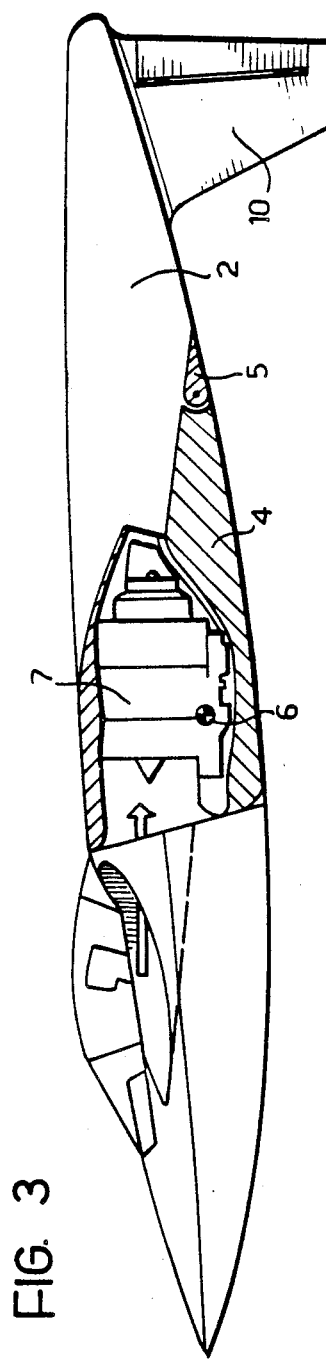
Figure 4:
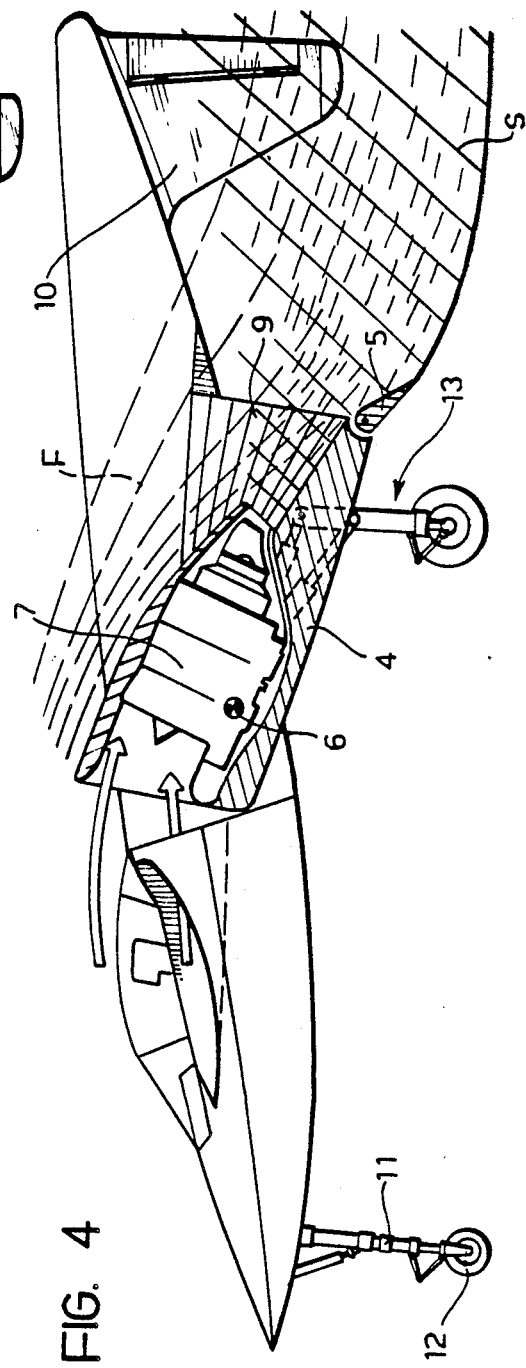

Further characteristics and advantages of the invention will be explained in the description which follows with reference to the appended drawings, provided purely by way of non-limiting example, in which:

FIGS. 1 and 2 are two perspective views of the aircraft according to the invention in two different operative conditions, and FIGS. 3 and 4 illustrate two partially-sectioned side views corresponding to the two operative conditions of FIGS. 1 and 2.

With reference to the drawings, an aircraft, generally indicated 1, has the general configuration of a delta-shaped all-wing aircraft with two fuselage sections 2 from which two lateral delta half-wings 3 extend outwardly and between which is a central wing 4 provided with a flap 5 and mounted for pivoting about a transverse axis 6 (see FIGS. 3 and 4) on the structure of the aircraft.

In the embodiment illustrated, the propulsion unit 7 for the aircraft is mounted on the structure of the wing 4 and thus moves with it when it pivots about the axis 6. The propulsion unit 7 has two rear nozzles 8 which generate a wide, flat jet which is directed over the dorsal surface of the central wing 4 close to its trailing edge. Naturally, the propulsion unit may be provided in a fixed position with means for deflecting the jets or several propulsion units may be pivoted, some fixed and some orientable. The sides of the wing 4 are delimited by the longitudinal surfaces 2a of the two fuselage sections 2. By virtue of this arrangement, the flow from the propulsion jets over the wing 4 gives rise, as already described in the U.S. Pat. No. 4,478,378 by the Applicants, to a single-surface ejector system in which the primary fluid is constituted by the propulsion jets, the secondary fluid is constituted by the relative air flow over the wing, and the successive zones of expansion, mixing and recompression of the ejector are defined by a single active surface constituted by the back of the wing. Moreover, the fact that the propulsion jets are directed onto the back of the wing close to its trailing edge causes a sharp downward deflection of these jets downstream of the wing due to the Coanda effect, as already described in the prior patent mentioned above.

By virtue of these characteristics, the aircraft has very high lift due to the circulation induced on the wing by the propulsion jets directed over it, due to the fact that the flow of the jets deflected downstream of the wing has a considerable vertical component, and due to the fact that this vertical component is further augmented as a result of the increased thrust of the propulsion jets generated by the ejector effect which is created over the wing 4. In order to ensure that a very considerable ejector effect is generated even when the wing 4 is rotated downwardly, as illustrated in FIG. 4, seals 9 are preferably provided at the two sides of the wing 4 so as to join the lateral edges of the wing to the fuselage sections 2 and thus ensure that the space above the wing is closed at the sides even when the wing is lowered.

The possibility of pivoting of the wing 4 enables the direction of the resultant aerodynamic force generated by the deflected propulsion jets to be controlled.

The rear ends of the two fuselage sections 2 have two vertical fin surfaces 10 which project downwardly and extend beneath the centre of gravity of the aircraft 1. This arrangement ensures that these fin surfaces are located immediately adjacent the mixed stream downstream of the wing. For reasons which have been indicated above, this ensures that the aircraft is self-stabilizing as regards any tendency to assume a transversal position to the direction of flight.

In FIG. 4, the secondary flow which is sucked back by the propulsion jets due to the ejector effect is indicated F, while the broken area indicated S corresponds to the zone of mixing of these propulsion jets with the secondary flow.

The aircraft 1 has a front undercarriage 11 with a pair of wheels 12 and two rear undercarriages 13 carried by the central wing 4.

What is claimed is:

1. A jet-propelled aircraft of the type having a wing and jet propulsion means adapted to direct propulsion jets over the dorsal surface of the wing adjacent its trailing edge, so as to achieve additional lift due to the super circulation induced on the wing and the downward deflection of the jets which occurs as a result of the Coanda effect immediately downstream of the wing, and so as to define a single-surface ejector system in which the primary fluid is constituted by the jets, a secondary fluid is constituted by the relative air flow over the wing, and the successive zones of expansion, mixing and recompression of the ejector are defined by a single active surface constituted by the back of the wing, wherein the aircraft has the general configuration of a delta-shaped all-wing aircraft with two fuselage sections, a central wing located between the fuselage sections and constituting the wing over which the propulsion jets are directed, and respective vertically elongated fin surfaces provided at the rear ends of the two fuselage sections rearwardly of said central wing and projecting downwardly to extend beneath the centre of gravity of the aircraft, the said fin surfaces being spaced from each other by a distance substantially corresponding to the width of the mixed stream of the propulsion jets and of the secondary flow downstream of the wing, so that the fin surfaces are laterally adjacent the mixed stream so as to achieve a self-stabilizing effect which immediately corrects any tendency of the aircraft to move sideways relative to the direction of flight.

2. An aircraft according to claim 1, wherein the central wing is pivotable about a transverse axis on the structure of the aircraft.

3. An aircraft according to claim 2, wherein the jet propulsion means are carried by the central wing.

4. An aircraft according to claim 3, wherein sealing elements are provided which connect the side edges of the central wing to the two fuselage sections so as to ensure that the space above the central wing is closed laterally even when the wing is pivoted downwardly.

* * * * *